3,100,939
GAGE FOR COUPLING MEMBERS
William John Blaiklock, Tuckaway, N.Y., and Charles S. Reasby, Worcester, Mass., assignors to the United States of America as represented by the Secretary of the Army
Filed Apr. 6, 1961, Ser. No. 108,973
3 Claims. (Cl. 33—174)
(Granted under Title 35, U.S. Code (1952), sec. 266)

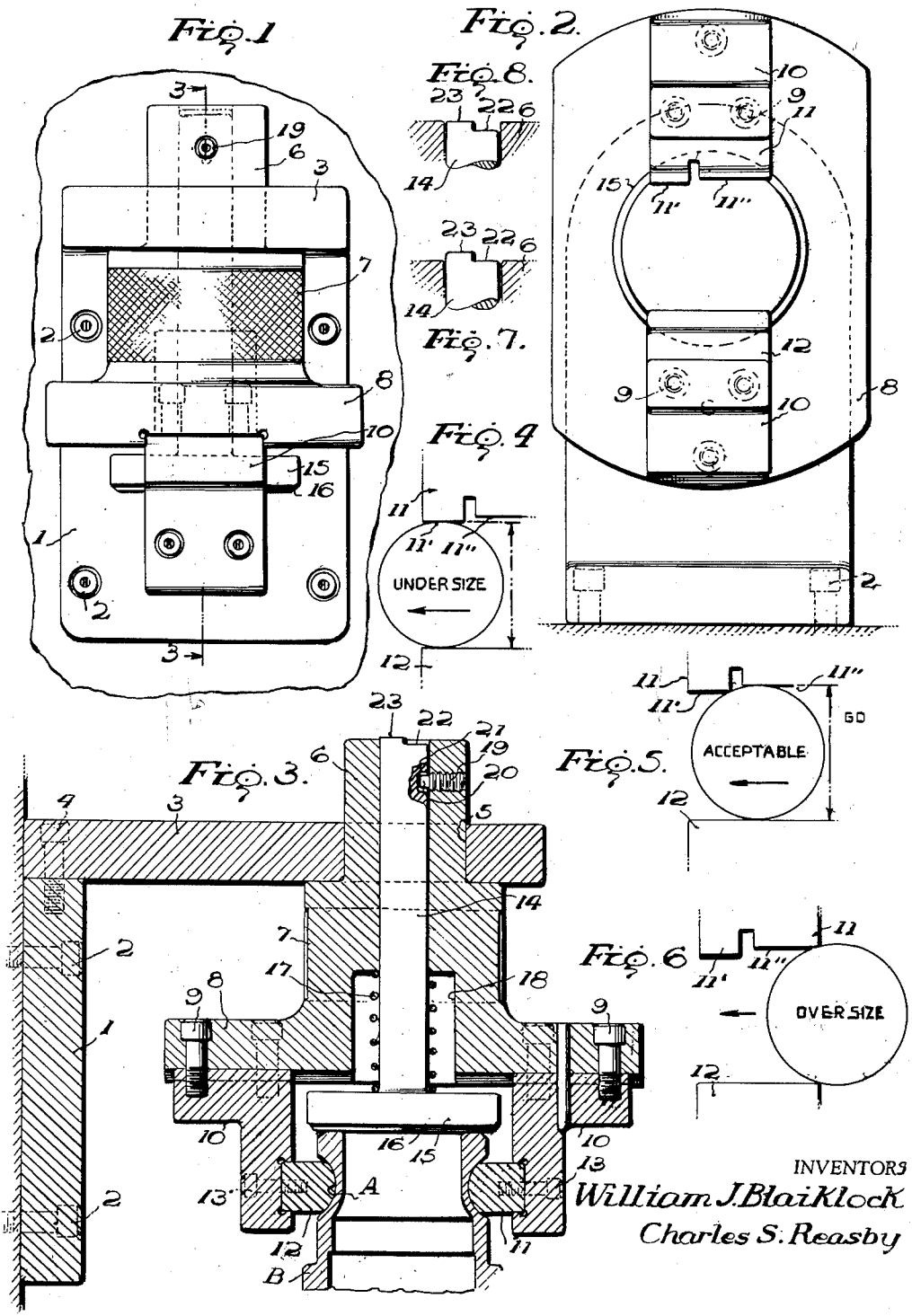

The invention described herein, if patented, may be manufactured and used by or for the Government for governmental purposes, without the payment to us of any royalty thereon.

This invention relates to gages for gaging critical dimensions of the male member of quick-disconnect couplings of the type shown in Patent No. 2,518,026 granted to John T. Krapp on August 28, 1950, in the inspection of such coupling members, and more particularly to gages for determining whether the diameter of the groove in the aforesaid coupling member and the location of this groove axially or lengthwise of this coupling member fall within predetermined critical limits or tolerances.

The coupling assemblies shown in the aforesaid patent include a female member and a male member or adapter as it is often designated. The adapter coupling member has a circumferential groove which for a particular assembly should be of predetermined base diameter and should be located a predetermined distance from the free end of the adapter. The improved gage of the present invention is designed particularly to determine whether the diameter of the groove and its location axially of the adapter coupling member fall within predetermined limits or tolerances. Where reference is made hereinafter in the specification or claims to coupling members or adapters, the aforesaid adapter member is meant.

A primary object of the invention resides in the provision of a gage which will operate substantially simultaneously not only to determine whether the diameter of the locking groove in the aforesaid quick-disconnect coupling member falls within predetermined limits but also to determine whether the location of the groove axially of the coupling member falls within predetermined limits.

A further object of the invention consists in combining two well known gages, namely, a "go-no-go" gage with a "flush pin" gage whereby they may operate substantially simultaneously to perform their gaging functions on coupling members of the aforesaid type.

Other objects and advantages of the invention will be apparent from the following description when taken in connection with the accompanying drawings, in which FIGURE 1 is a front elevation view of the novel gage;

FIGURE 2 is a bottom plan view thereof;

FIGURE 3 is a sectional view taken on the line 3—3 of FIGURE 1;

FIGURES 4, 5 and 6 are diagrammatic views illustrating the operation of the "go-no-go" portion of the gage; and FIGURES 7 and 8 are diagrammatic views illustrating the operation of the flush pin gaging mechanism.

Referring to the drawings in greater detail and by reference numerals, the gage is shown mounted upon a wall or like fixed supporting structure by a mounting bracket including a vertical plate 1 adapted to be secured to a wall or the like as by means of bolts 2 and a horizontal plate 3 secured to the upper end of the plate 1 by means of screws, one of which is shown at 4 in FIGURE 3. The horizontal plate 3 is provided with an opening 5 in which is releasably secured in any preferred manner the reduced upper end portion 6 of the body of the gage which also includes an enlarged intermediate portion 7 and an outwardly flared lower end portion 8.

Secured to the undersurface of the outwardly flared portion 8 by means of screws 9 is a pair of anvil holders 10, 10, and opposed anvils or feelers 11 and 12 are secured to the opposed faces of these anvil holders as by means of screws 13. These anvils, which are used to gage the diameter of the Groove A in the coupling member B, constitute the previously mentioned "go-no-go" portion of the gage. For this purpose, the anvil 11 is provided with stepped portions 11' and 11" (FIGURES 2 and 4 to 6) the flat gaging faces of which lie in parallel planes spaced a distance corresponding to the amount of tolerance to be allowed in the diameter of the grooves A in the coupling members B. As is usual in the "go-no-go" type of gage, if the article being gaged is small enough to enter the portion 11" but yet too large to enter the portion 11' as shown in FIGURE 5, then the article is within the allowed tolerance limits. On the other hand, if the article will not enter the portion 11" of the gage as shown in FIGURE 6 or will enter it and pass into the portion 11' as shown in FIGURE 4, then the article is too large in the first instance and too small in the second and should be rejected in both instances.

Slidably mounted in a centrally located axial bore extending through the body portions 6 and 7 and 8, of the gage is a flush pin 14 having a head or disk 15 on its lower end which is peripherally beveled as indicated at 16. Flush pin 14 is biased downwardly as viewed in FIGURE 3 by a spring 17 housed in an enlarged portion 18 of the bore in the body of the gage. This spring reacts against the head 15 on the flush pin 14 and the inner end of the enlarged bore 18. Axial movement of the flush pin 14 under the influence of spring 17 or in opposition thereto is limited by the anchoring means including a set screw 19 having an inner end or dog 20 which engages in an axial slot 21 in the periphery of the flush pin. This inner end may be pointed or it may be of circular or disk-like conformation, for example. However, conformed, inner end 20 and axial slot 21 should be dimensioned to permit axial movement of the flush pin 14 through a range which will be explained below.

The upper end of the flush pin 14 is provided with a cut-away portion so as to provide axially stepped or spaced semi-circular or segmental shaped upper and lower end portions 22 and 23, respectively. These segments are vertically spaced from each other a distance corresponding to the amount of tolerance permissible as regards the positioning of the groove A axially of the coupling B as will appear from the description of the operation of the gage which follows. For the purpose of illustration, the spacing of the portions 22 and 23 has been somewhat exaggerated in FIGURES 3, 7 and 8.

As previously explained, the improved gage of the present invention preferably is mounted in the fixed wall bracket formed by plates 1 and 3 when it is being used. However, the body of the gage comprising the portions 6, 7 and 8 and the parts secured thereto may be dismounted from the bracket and held manually while it is being used. To provide a better grip on the body when so used, the intermediate portion 7 thereof may be knurled as indicated in FIGURE 1.

Assuming the gage is mounted in a wall bracket as shown in FIGURE 3, to gage a coupling member such as the member B, it is inserted into gaging position by passing the grooved part A therein between the anvils 11 and 12 from the stepped side 11" as shown in FIGURES 5 and 6. If the groove A will not pass between these anvils, a condition shown diagrammatically in FIGURE 6, the coupling member should be rejected as oversize. If it passes freely through the space between step 11″ and the anvil 12, but is stopped by the step 11′ as shown in FIGURE 5, the coupling member B is acceptable. However, before determining this, the coupling member B preferably should be turned through an angle of approximately 180° at this position. This will reveal the presence of any high spots in the groove A. Finally, if the coupling member B passes through the space between the step 11′ and anvil 12, as shown in FIGURE 4, it is undersize.

At the same time that the coupling member B is being moved to the gaging position shown in FIGURES 3 and 5, it actuates the flush pin 14 so that it can be determined whether or not the groove A is properly located axially or lengthwise of the coupling member B to fall within the limits of tolerance. This simultaneous action occurs by virtue of the fact that the spring 17 constantly biases the flush pin 14 to its lowermost position as shown in FIGURE 1. Thus, as the coupling member B is moved into the position in the gage shown in FIGURE 5, its upper peripheral edge, which may be somewhat beveled as shown in FIGURE 3, engages the beveled edge 16 on the head of the flush pin 14 and cams the latter upwardly. The user of the gage can then determine whether or not the groove A is properly located by fingering the top side of the portion 6 of the body of the gage, preferably by running the fingernail of an index finger along a line normal to the shoulder between the stepped segments 22, 23 on the flush pin. In this manner the operator can detect whether one or both of the segments 22 and 23 are positioned above or below the top surface of the body portion 6. If neither can be detected, the location of the groove A in the coupling member B in the gage is axially off position an amount beyond the lower limit of tolerance, the limits of tolerance being the height of the shoulder between the segments 22 and 23.

Any coupling member which gages as shown in FIGURES 7 and 8 or at any position intermediate these two is acceptable. However, not only are coupling members which gage below the lower limit of tolerance not acceptable as previously explained, but if the flush pin 14 is raised high enough by a coupling member in the gage so that both segments 22 and 23 lie above the level of the top surface of the body portion 6, the coupling member is beyond the upper limit of tolerance, and hence subject to rejection.

In accordance with the patent statutes, we have described what we now consider to be the preferred form of the invention, but since various minor changes may be made in structural details without departing from the spirit of the invention, it is intended that all such changes be included within the scope of the appended claims.

We claim:

1. In a gage for gaging the diameter of a circumferential groove in a workpiece and the axial position of the groove in relation to one end surface of the workpiece, a body member, a pair of go-no-go anvils rigidly supported by the body in opposed fixed positions to operatively receive the grooved portion of the workpiece between them for gaging the diameter of the groove in the workpiece, a second gage movably supported by the body in spaced relation to the anvils to engage an end surface of the workpiece when such workpiece is disposed in gaging position between the anvils, said second gage being movable in the direction of the axis of the workpiece and the axis of symmetry of the fixed anvils, and resilient means urging the second gage toward the fixed anvils to maintain the second gage in contact with the end of the workpiece while the workpiece is restrained against axial movement by engagement of the fixed anvils with the walls of the groove in the workpiece.

2. In a gage for simultaneously gaging the diameter of a circumferential groove in a workpiece and the axial position of the groove in relation to one end surface of the workpiece, a body member, a pair of spaced go-no-go anvils rigidly supported by the body in opposed fixed positions to operatively receive the grooved portion of the workpiece between them for gaging the diameter of the groove in the workpiece, a flush pin gage movably supported by the body in spaced relation to the anvils and having a head on its end nearest the anvils to engage an end surface of the workpiece when such workpiece is disposed in gaging position between the anvils, said flush pin gage being movable in a direction coaxial with the axis of the workpiece in its gaging position and the axis of symmetry of the fixed anvils, and resilient means urging the flush pin gage toward the fixed anvils to maintain the flush pin gage in contact with the end surface of the workpiece while the workpiece is restrained against axial movement by engagement of the fixed anvils with the walls of the groove in the workpiece.

3. In a gage for simultaneously gaging the diameter of a circumferential groove in a workpiece and the axial position of the groove in relation to one end surface of the workpiece, a body structure having a substantially central bore, a pair of go-no-go anvils rigidly supported by the body in opposed spaced relation equidistant from the axis of the bore to operatively receive the grooved portion of the workpiece between them for gaging the diameter of the groove, a flush pin gage reciprocally mounted in the bore and having an enlarged head on its end nearest the anvils, said head being spaced from the anvils and disposed in a plane substantially parallel to the plane of the anvils, said flush pin gage being movable in the direction of the axis of the workpiece when such workpiece is disposed in gaging position between the anvils, and means resiliently urging the flush pin head toward the anvils, said head having a beveled peripheral edge for engagement with the adjacent end surface of the workpiece for camming the flush pin head out of the path of the workpiece against the tension of the resilient means so that the flush pin is moved by the workpiece to gaging position relative to the anvils while the workpiece is restrained against axial movement by engagement of the fixed anvils with the walls of the circumferential groove in the workpiece.

References Cited in the file of this patent

UNITED STATES PATENTS

| | | |
|---|---|---|
| 2,370,220 | Aller et al. | Feb. 27, 1945 |
| 2,471,961 | Jones | May 31, 1949 |
| 2,514,794 | Prince | July 11, 1950 |
| 2,684,535 | Reicherter | July 27, 1954 |

OTHER REFERENCES

Modern Gaging Practice by Dowd & Curtis pp. 91 and 92, published by the Engineering Magazine Co., N.Y., N.Y. (Copy in Scientific Library.)